L. BATTYANY, L. HLAVACS & M. KOTA.
AGRICULTURAL IMPLEMENT.
APPLICATION FILED JULY 7, 1908.
917,236.
Patented Apr. 6, 1909.
2 SHEETS—SHEET 1.
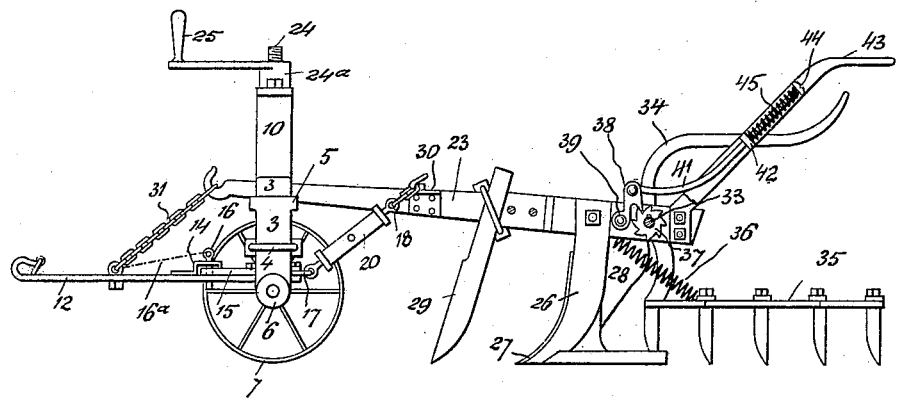
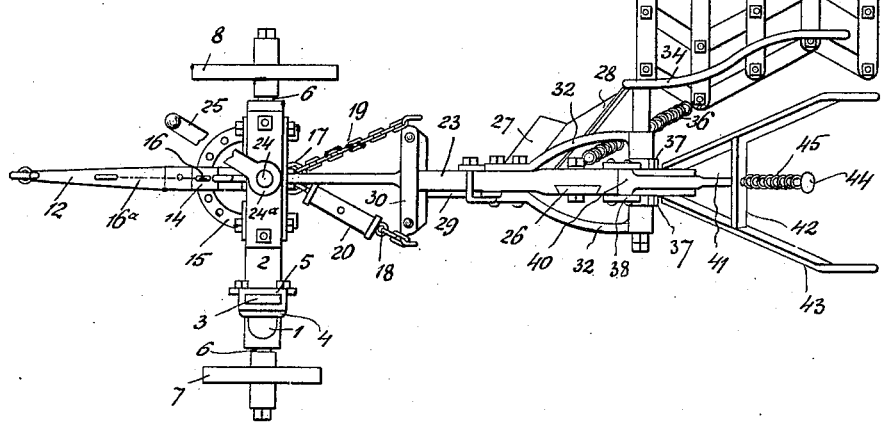

L. BATTYANY, L. HLAVACS & M. KOTA.
AGRICULTURAL IMPLEMENT.
APPLICATION FILED JULY 7, 1908.

917,236.

Patented Apr. 6, 1909.
2 SHEETS—SHEET 2.

Witnesses
A. H. Rabsag,
R. H. Butler

Inventors
L. Battyany,
L. Hlavacs, and
M. Kota
By N. C. Evert & Co.
Attorneys

UNITED STATES PATENT OFFICE.

LOUIS BATTYANY, LOUIS HLAVACS, AND MICHEAL KOTA, OF JOHNSTOWN, PENNSYLVANIA.

AGRICULTURAL IMPLEMENT.

No. 917,236.  Specification of Letters Patent.  Patented April 6, 1909.

Application filed July 7, 1908. Serial No. 442,274.

*To all whom it may concern:*

Be it known that we, LOUIS BATTYANY, LOUIS HLAVACS, and MICHEAL KOTA, subjects of the King of Hungary, residing at Johnstown, in the county of Cambria and State of Pennsylvania, have invented certain new and useful Improvements in Agricultural Implements, of which the following is a specification, reference being had therein to the accompanying drawing.

This invention relates to a combined plow and harrow, and the primary object of our invention is to provide a novel agricultural implement that can be expeditiously and economically used for tilling the soil.

Another object of this invention is to provide a simple and durable agricultural implement that can be readily used upon irregular surfaces, the implement being provided with novel adjustments whereby the same can be used upon an inclined surface, either as a plow or harrow.

A further object of this invention is to provide a strong and durable implement having adjustments for regulating the depth and width of a furrow.

With the above and other objects in view which will more readily appear as the invention is better understood, the same consists in the novel construction, combination and arrangement of parts to be presently described.

Figure 3:
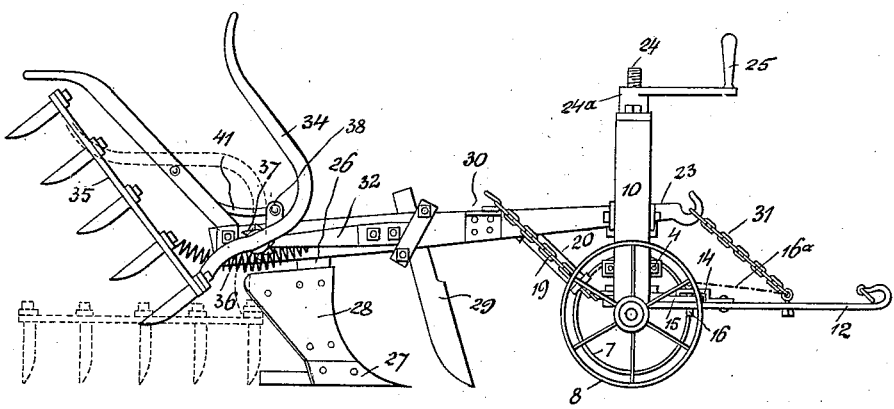
Figure 4:
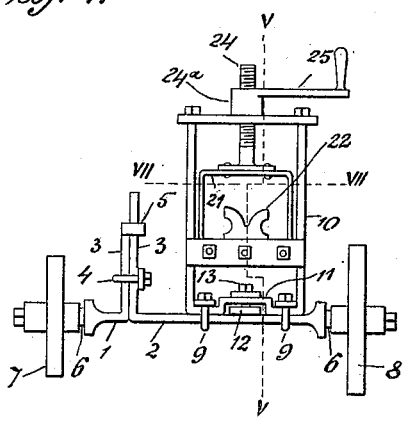
Figure 5:
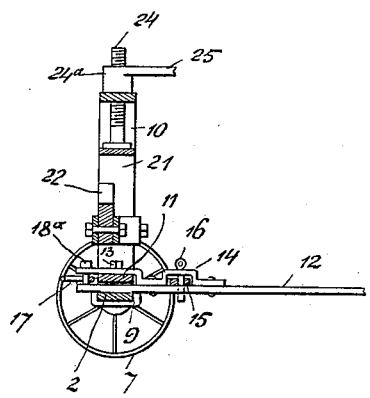
Figure 6:
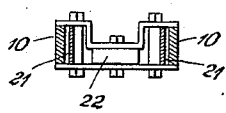

Referring to the drawings: Figure 1 is a side elevation of our implement, Fig. 2 is a plan of the same, Fig. 3 is a side elevation of the implement with the harrow thereof in an elevated position, Fig. 4 is an elevation of the front truck of the implement, Fig. 5 is a vertical sectional view taken on the line V—V of Fig. 4, and Fig. 6 is a horizontal sectional view taken on the line VII of Fig. 4.

Our improvement comprises a combined plow and harrow, which is detachably connected to a truck adapted to be drawn by horses or a traction engine. The truck is provided with certain adjustments, whereby it can be used upon an inclined surface, and with other adjustments for regulating the depth and width of a furrow made by the plow of the implement.

Reference will first be had to the truck which comprises a two-part axle, the parts 1 and 2 having their confronting ends bent upwardly, as at 3, and adjustably secured together by a clamp 4. The upwardly bent end 3 of the part 2 passes through a guide 5 carried by the part 1, whereby said parts can be easily and quickly vertically adjusted by loosening the clamp 4. This adjustment is provided, whereby our implement can be used upon an inclined surface, as the side of a hill, the truck serving to maintain the implements attached thereto in a horizontal position, particularly when the hill side is traversed. The opposite ends of the parts 1 and 2 are provided with spindles 6, upon which are journaled wheels 7 and 8, the wheels 7 being of a lesser diameter than the wheels 8 for the purpose above mentioned.

Secured upon the part 2 by clamps 9 is a housing 10 having a central bridge 11 providing clearance for a tongue 12 pivotally mounted upon the part 2 by a king bolt 13. Secured to the tongue 12 is a yoke 14, through which extends a U-shaped pivoted frame 15 connected to the housing 10 by the clamps 9. The tongue 12 is held in engagement with the frame 15 by a pin 16 passing through one of the apertures of the frame and apertures provided therefor in the yoke 14 and the tongue 12. The pin 16 is attached to the tongue 12 by a chain or cable 16$^a$. By means of the adjustment of the pivoted tongue 12 we are enabled to set said tongue whereby the truck can be drawn in the desired direction, preventing the "skidding" of the wheels 7 and 8 when the implement is used upon a hill side. Loosely mounted between the rear end of the yoke 14 and the tongue 12 is a large link 17, said link being held by a pin 18$^a$. Attached to the link 17 are two chains 18 and 19, the former having a turn buckle 20 for a purpose that will presently appear.

In the housing 10 and guided thereby is a stirrup 21 having a V-shaped bearing 22 for the hook-shaped end of a plow beam 23. The stirrup 21 is provided with a vertical screw 24 extending through the top of the housing 10, said screw being provided with a nut 24$^a$ having a handle 25, by which said nut can be easily rotated to raise and lower the stirrup 21, this vertical adjustment of the stirrup 21 having a purpose that will presently appear. The plow beam 23 adjacent to the rear end thereof is provided with a depending support 26 for a plow point 27 and a mold board 28, these parts being common to the ordinary plow. The beam 23 also supports an adjustable furrow cutter 29, common to the ordinary plow, and is provided with a cross-head 30 to which the chains 18 and 19 are connected, as best shown in Fig. 2 of the drawings. The forward end of the plow beam 23 is provided with a hook 23ᵃ which is connected by a chain 31 to the tongue 12, said chain retaining the beam in the V-shaped bearing 22 provided therefor in the stirrup 21 of the truck. The beam 23 adjacent to the support 26 is provided with side bearings 32 for a shaft 33 extending through the rear end of the beam 23. Upon one end of the shaft is mounted the arm 34 of a harrow 35, said harrow being normally held in a horizontal position by the tension of a coil spring 36 attached to said harrow, and to the plow beam 23. Upon the shaft 33 are mounted revoluble ratchet wheels 37 normally engaged by pawls 38 pivotally connected to the beam 23, as at 39. These pawls are connected together by the cross-head 40 of a lever 41, said lever extending upwardly through the brace 42 of plow handles 43, carried by the rear end of the beam 23. The end of the lever 41 is provided with a head 44 and interposed between said head and the brace 42 is a coil spring 45, said spring encircling the lever 41, and normally holding said lever in an elevated position, whereby the pawls 38 will be normally held in engagement with the ratchet wheels 37.

In operation, the raising or lowering of the stirrup 21 elevates or lowers the forward end of the beam 23, consequently the plow point 27 will be positioned to provide a deep or shallow furrow. If the implement is simply to be used as a cultivator or for plowing purposes, the harrow 35 can be elevated and retained in an elevated position by the pawls 38 engaging the ratchet wheels 37 of the shaft 33.

By adjusting the turn buckle 20 of the chain 18, the plow and harrow can be positioned, whereby when the truck is moved, the plow and harrow will be thrown in a direction at an angle to that which the truck moves. By this adjustment a furrow of a desired width can be obtained, and more positive operation of the plow and harrow upon a hill side accomplished. The chains 18, 19 and 31 also permit of the plow and harrow being adjusted with relation to the truck, it being advisable to allow a sufficient space to intervene, particularly when plowing a deep furrow.

It is obvious that by pressing downwardly upon the head 44 of the lever 41, that the harrow 35 can be released from an elevated position; the spring 36 immediately returning the harrow to a horizontal position and retaining the same in engagement with the soil to be agitated thereby.

The implement in its entirety is constructed of strong and durable metal, and is designed to be operated by one attendant, who can readily adjust the implement according to the character of soil traversed thereby.

While in the drawings forming a part of this application there is illustrated the preferred embodiments of our invention, it is to be understood that the elements therein can be varied or changed as to shape, proportion and manner of assemblage without departing from the spirit of the invention.

Having now described our invention what we claim as new, is:—

1. An agricultural implement comprising the combination with a plow beam, of a transversely extending shaft mounted at the rear thereof, an angle-shaped shifting arm connected intermediate its ends to one end of said shaft, a harrow carried on the lower end of said arm, a spring connecting the harrow to said beam, ratchet wheels upon the shaft, pawls pivotally connected to the beam and engaging the ratchet wheels, a cross head connecting the pawls, and a spring-controlled lever connected to the cross head for operating it to shift the pawls to clear the ratchet wheels.

2. An agricultural implement comprising the combination with a plow beam, of a shaft carried thereby, a shifting arm attached intermediate its ends to the shaft, a harrow connected to the lower end of the shifting arm, ratchet wheels upon said shaft, a pair of pawls pivoted to the beam and engaging the ratchet wheels, a cross head connecting the pawls, and a rearwardly extending spring-controlled lever attached to the cross head.

3. An agricultural implement comprising the combination with a plow beam, of a shaft carried thereby, a shifting arm attached intermediate its ends to the shaft, a harrow connected to the lower end of the shifting arm, ratchet wheels upon said shaft, a pair of pawls pivoted to the beam and engaging the ratchet wheels, a cross head connecting the pawls, and a rearwardly extending curvilinear spring-controlled lever having the forward end thereof connected to the cross head for operating it to shift the pawls clear of the ratchet wheels.

4. An agricultural implement comprising the combination with a plow beam, handles projecting from the rear end of said beam, of a shaft carried at the rear of the beam, a shifting arm attached intermediate its ends to said shaft, a harrow connected to the shifting arm, ratchet wheels upon said shaft, a pair of pawls pivoted to the beam and engaging the ratchet wheels, a cross-head connecting the pawls, and a rearwardly-extending spring controlled lever attached to the cross-head and supported by the handles.

5. An agricultural implement comprising the combination with a plow beam, handles projecting from the rear end of said beam of a shaft carried at the rear of the beam, a shifting arm attached intermediate its ends to said shaft, a harrow connected to the shifting arm, ratchet wheels upon said shaft, a pair of pawls pivoted to the beam and engaging the ratchet wheels, a cross-head connecting the pawls, a rearwardly-extending spring controlled lever attached to the cross-head and supported by the handles, and a spring connected to the beam in advance of the cross-head and further connected to said harrow.

In testimony whereof we affix our signatures in the presence of two witnesses.

LOUIS BATTYANY.
LOUIS HLAVACS.
MICHEAL KOTA.

Witnesses:
   WILL J. LAMBERD,
   A. J. CARREL.